United States Patent [19]

Juhan

[11] Patent Number: 4,715,660
[45] Date of Patent: Dec. 29, 1987

[54] VEHICLE DISC WHEEL WITH MULTIPLE TIRES ON ONE RIM

[75] Inventor: Jaroslaw V. M. Juhan, Geneva, Switzerland

[73] Assignee: JJD S.A., Geneva, Switzerland

[21] Appl. No.: 6,335

[22] Filed: Feb. 2, 1987

Related U.S. Application Data

[63] Continuation of Ser. No. 709,131, Mar. 7, 1985, abandoned.

[30] Foreign Application Priority Data

Mar. 8, 1984 [CH] Switzerland ............................ 1157/84

[51] Int. Cl.⁴ ........................ B60B 11/04; B60B 11/06
[52] U.S. Cl. ................................ 301/13 R; 301/36 R; 301/13 SM
[58] Field of Search ............... 301/13 R, 13 SM, 36 R

[56] References Cited

FOREIGN PATENT DOCUMENTS

| 734796 | 10/1932 | France | 301/13 R |
| 1377317 | 9/1964 | France | 301/13 R |
| 645854 | 10/1984 | Switzerland | 301/36 R |
| 2080212 | 2/1982 | United Kingdom | 301/36 R |

Primary Examiner—David A. Scherbel
Attorney, Agent, or Firm—Cushman, Darby & Cushman

[57] ABSTRACT

A vehicle wheel intended for mounting at least two pneumatic tires on the same rim, has at least two mounting or fitting sections with an annular space coaxial with the rim and open between the facing sides of the fitting sections. A plurality of openings place this space in communication with the lateral face of the wheel and/or with the space defined between the internal face of the disc of the wheel and the internal face of the rim.

3 Claims, 2 Drawing Figures

VEHICLE DISC WHEEL WITH MULTIPLE TIRES ON ONE RIM

This is a continuation of application Ser. No. 709,131, filed Mar. 7, 1985, which was abandoned upon the filing hereof.

The present invention relates to a vehicle wheel comprising a lateral disc and at least two fitting rings for pneumatic tires, mounted side by side on a single rim.

This type of wheel according to the invention can be applied more particularly to the front and/or rear wheels of a high speed automobile, said wheel comprising a rim designed for fitting a plurality of pneumatic tires, as described, for example, in Swiss Pat. No. 645,854.

An object of the invention is to facilitate the discharge of water or melting snow tending to accumulate in the space between the sides of adjacent pneumatic tires when the vehicle is travelling on a surface which is wet or covered with snow, and to thereby further reduce the risk of skidding or aquaplaning.

The invention provides a vehicle wheel comprising a lateral disc and at least two fitting rings for pneumatic tires, mounted side by side on a single rim connected on one side thereof to said lateral disc, said fitting rings having adjacent sides defining an annular passage coaxial with the rim and open between said adjacent sides, wherein said rim is provided with a plurality of openings whereby this passage communicates with the lateral face of the wheel and/or with the space defined between the internal face of the disc of the wheel and the internal face of the rim.

According to one embodiment of the invention, the rim comprises two annular rim elements of different widths, each supporting one of the fitting rins. These two rim elements are concentrically arranged, leaving between them a gap which forms together with the adjacent sides of the fitting rings said annular passage, an inner rim element having the greater width being arranged within the other, outer element.

According to this embodiment, openings whereby the annular passage is in communication with the lateral face of the wheel may be formed in the outer rim element of smaller width.

In addition, said annular passage may be in communication with the space defined between the wheel disc and the rim by means of openings formed in the rim element of greater width.

The said openings are advantageously disposed at regular angular intervals on the circumference of the rim elements.

The rim, the disc and at least one of the fitting rings may advantageously form an assembly obtained by moulding in one piece.

The annular rim elements may also be removably mounted on the lateral wheel disc.

Further features of the invention will become more clearly apparent from the following description of particular embodiments of the wheel according to the invention, given by way of example with reference to the accompanying drawings, wherein.

Figure 1:
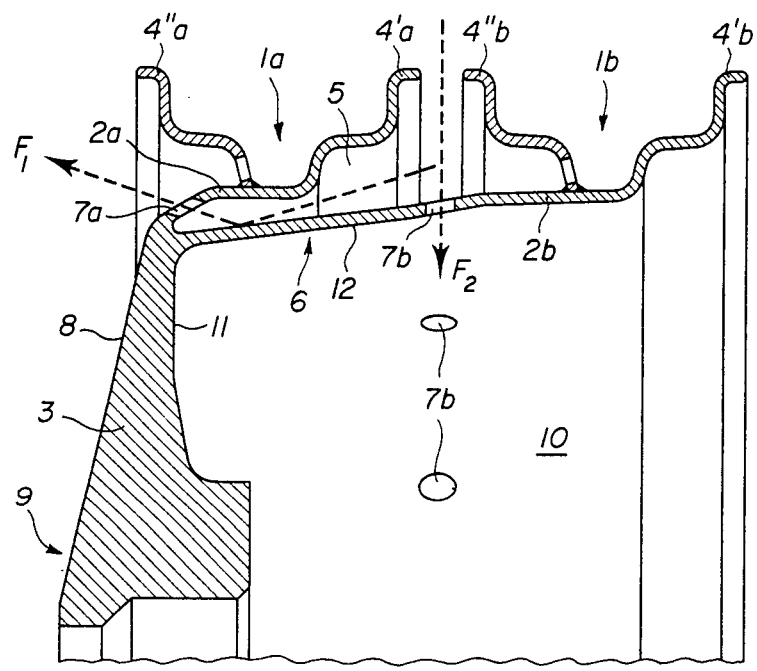
FIG. 1 is a partial diametral section of a first embodiment.

In the embodiment illustrated in FIG. 1, the wheel comprises two fitting rings 1a and 1b for pneumatic tires (not shown), each of these rings being supported by a respective annular rim element 2a and 2b. The rim elements 2a and 2b are concentrically disposed and form with the wheel disc 3 which is a lateral disk an assembly formed by moulding in one piece. One of the sides 4'a and 4'b of the rings 1a and 1b also forms a part of this single piece, while the other respective sides or incurvated lateral walls 4"a and 4"b of the rings 1a and 1b are assembled, by welding or brazing, on the respective rim elements 2a and 2b. The edges or sides of the fitting rings may also be assembled on the rim elements in any other suitable manner, for example, by screws or rivets.

An annular space 5 between the two rim elements 2a and 2b is defined by the adjacent sides 4'a and 4"b of the fitting rings 1a and 1b and forms a passage coaxial with the rim 6 and open between the respective sides 4'a and 4"b of the fitting rings 1a and 1b. A plurality of openings 7a and 7b, respectively formed in the rim elements 2a and 2b, allow the space 5 to be in communication on one hand with the lateral face 8 of the wheel 9, in the part of the rim 6 which is adjacent to the junction of the rim with the periphery of the disc 3 and, on the other hand, with the space 10 defined between the internal face 11 of the disc 3 and the internal face 12 of the rim 6.

The openings 7a and 7b may be of circular form, although it is understood that they could be of any other appropriate form, while their number as well as their dimensions are determined so as to permit easy evacuation, in the directions indicated by the arrows F1 and F2 shown in broken lines, of water which may accumulate in the space or passage 5 when the wheel is fitted with its normally inflated pneumatic tires and runs on a surface which is wet or covered with melting snow, which is driven in between the tire walls facing one another.

The openings 7a and 7b are advantageously disposed at regular angular intervals on the circumference of the rim elements.

Figure 2:
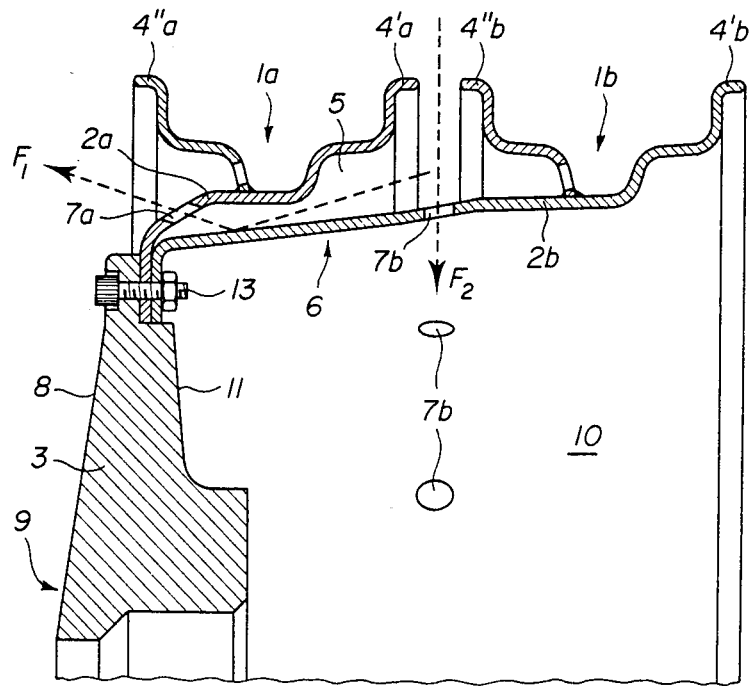
FIG. 2 is a partial diametral section of a second embodiment.

The wheel structure shown in FIG. 2 is similar to that in FIG. 1, and the elements which are identical have the same reference numerals. However, in this second embodiment, the rim elements 2a and 2b are removably assembled on the periphery of the disc 3 by means of screws 13.

The wheel structure may be provided with openings formed only in the rim element 2a or in the rim element 2b. It may be pointed out that the openings 7b in the rim element 2b may provide improved cooling of the vehicle brakes, while it may on the contrary be desirable to avoid such openings in order to protect the internal parts of the wheel against the projection of mud or corrosive liquids, particularly aqueous salt solutions used for lowering the freezing point of the water on roads exposed to the danger of black ice.

Although the foregoing description is concerned more particularly with embodiments of the wheel comprising two mounting or fitting rings for pneumatic tires, it will be understood that the wheel according to the invention could possibly comprise a number of mounting rings greater that two, as well as several annular ducts or passages for collecting and permitting the evacuation of water accumulated between the walls of pneumatic tires.

I claim:

1. Vehicle wheel comprising a lateral disc and a rim provided for mounting of at least two pneumatic tires, said rim comprising at least two distinct elements of different width, which are solidly connected on one side thereof to said lateral disc and the respective other sides of which are incurvated to form lateral walls of tire fitting rings and further incurvated lateral walls of tire fitting rings are solidly connected on the central parts of the rim elements, an annular passage opening between the incurvated lateral walls which are arranged to face each other, wherein said rim elements are coaxially arranged on one side of said lateral disc, the element having the smaller width being placed in outer diametral position with respect to the element having the larger width.

2. Vehicle wheel according to claim 1, comprising two rim elements wherein the element having the larger width is provided with a plurality of openings having their respective axis arranged at regularly spaced intervals along a circumference located within the area of said annular passage.

3. Vehicle wheel according to claim 1 or 2, and comprising two rim elements, wherein the element having the smaller width is provided with a plurality of openings having their respective axis arranged at regularly spaced intervals along a circumference located between the adjacent sides of the two rim elements.

* * * * *